Patented July 8, 1941

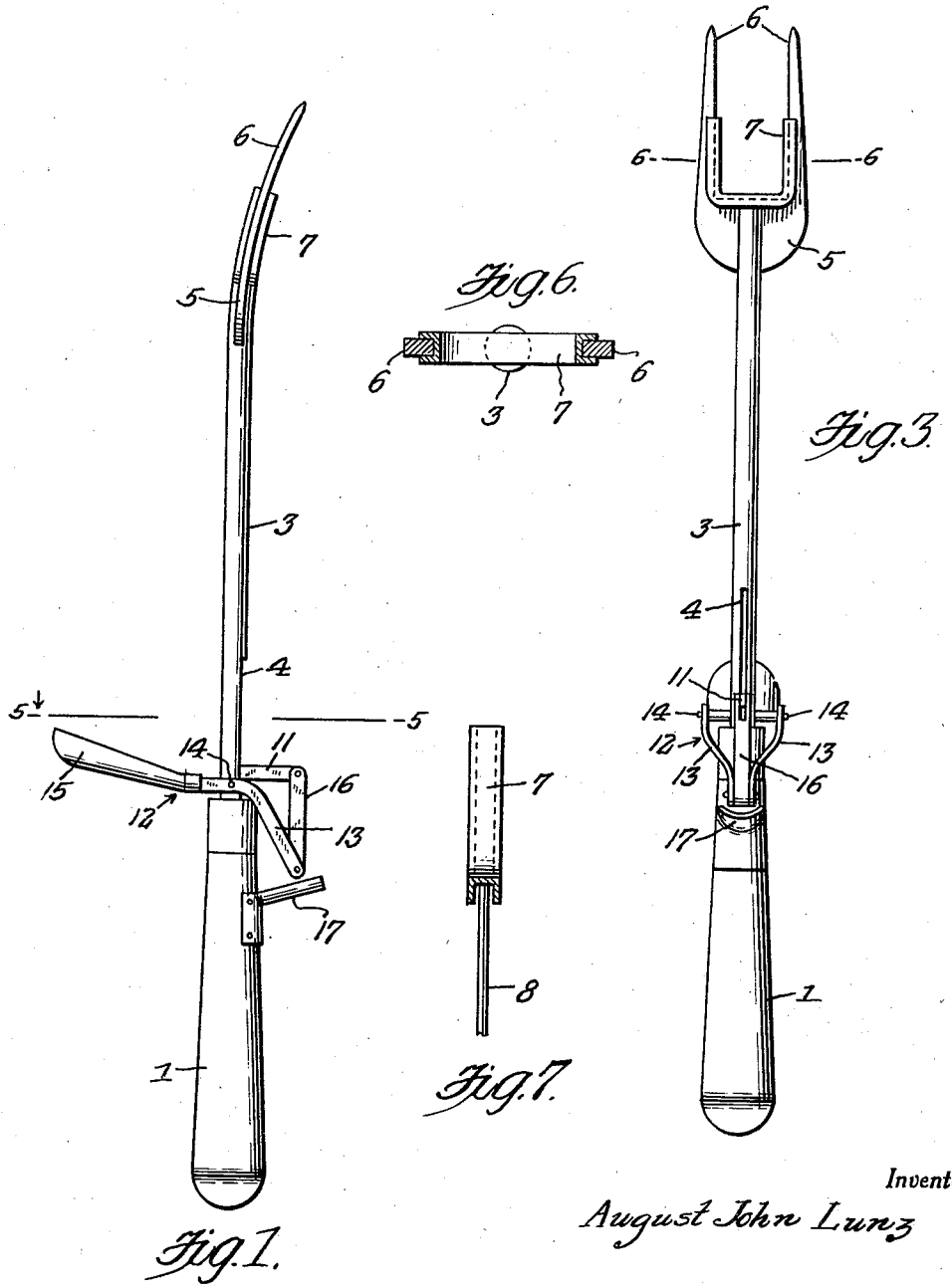

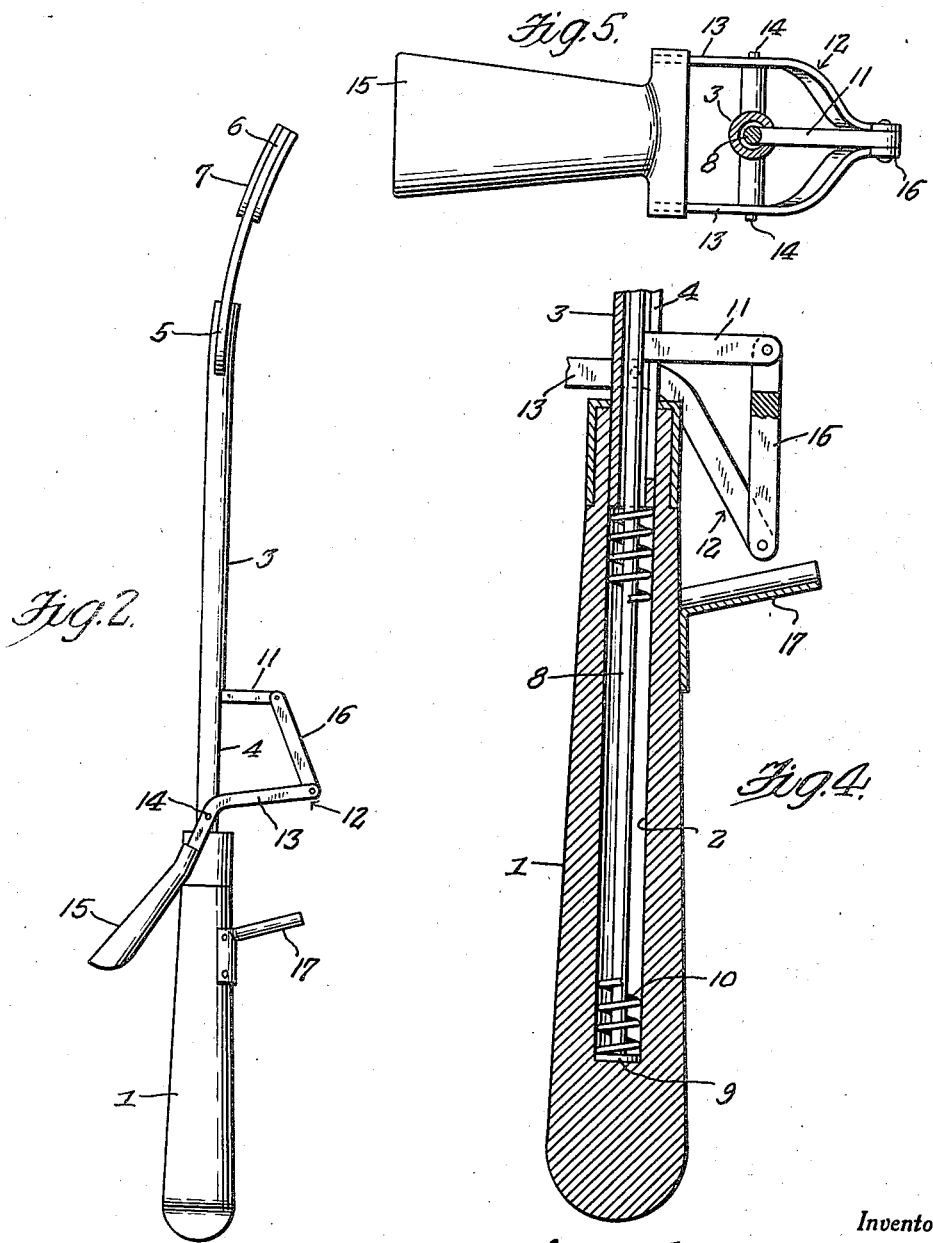

2,248,685

UNITED STATES PATENT OFFICE 2,248,685

KITCHEN FORK

August John Lunz, Ponca, Nebr.

Application March 16, 1940, Serial No. 324,398

4 Claims. (Cl. 30—129)

The present invention relates to new and useful improvements in kitchen forks and has for its primary object to provide, in a manner as hereinafter set forth, a device of this character comprising novel means through the medium of which meats and other foods may be conveniently removed therefrom.

Other objects of the invention are to provide a fork of the aforementioned character which will be comparatively simple in construction, strong, durable, highly efficient and reliable in use, compact, light in weight, sanitary and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a kitchen fork constructed in accordance with the present invention.

Figure 2 is a view in side elevation of the device, showing the stripper in projected position.

Figure 3 is a bottom plan view.

Figure 4 is a view in longitudinal section through the inner portion of the device.

Figure 5 is a cross sectional view, taken substantially on the line 5—5 of Figure 1.

Figure 6 is a cross sectional view, taken substantially on the line 6—6 of Figure 3.

Figure 7 is a detail view in longitudinal section through the slidable stripper.

Referring now to the drawings in detail, it will be seen that the embodiment of the invention which has been illustrated comprises an elongated, tapered handle 1 which may be of wood or any other suitable material. Extending into the handle 1 from the forward end thereof to a point adjacent its rear end is a bore or socket 2. Mounted on the forward end of the handle 1 is a tubular shank 3 of suitable material. The inner end portion of the shank 3 is engaged in the forward end portion of the socket 2 for mounting said shank on the handle 1. The inner portion of the tubular shank 3 has formed therein a longitudinal slot 4.

Firmly secured in any suitable manner on the outer or forward end portion of the tubular shank 3 is a longitudinally curved head 5. The head 5 comprises a pair of tines 6. Mounted in the head 5 and slidable on the tines 6 is a substantially U-shaped stripper 7. As illustrated to advantage in Figs. 6 and 7 of the drawings, the stripper 7 is substantially channel shaped in cross section for slidably securing said stripper in the head 5.

Slidably mounted in the tubular shank 3 is a resilient rod 8. The stripper 7 is secured to the forward or outer end of the rod 8 for actuation thereby. The rod 8 extends into the socket 2 of the handle 1 and is provided with a head 9 on its inner end. A coil spring 10 in the socket 2 is engaged with the head 9 for retracting the rod 8 and the stripper 7.

Mounted on the rod 8 is an arm 11 which is operable in the slot 4. The reference numeral 12 designates generally an operating lever for the stripper 7. The lever 12 includes a pair of bars 13 which straddle the inner portion of the tubular shank 3 and which are pivotally connected thereto at an intermediate point, as at 14. Mounted on one end portion of the bars 13 is a handle 15. The other end portions of the bars 13 converge and are pivotally connected to a link 16. One end portion of the link 16 is pivotally connected to the free end portion of the arm 11. The reference numeral 17 designates a hand guard or shield on the forward portion of the handle 1.

It is thought that the manner in which the fork functions will be readily apparent from a consideration of the foregoing. Briefly, when it is desired to remove meat or other foods from the head 5 of the fork, the lever 12 is swung from the position shown in Fig. 1 of the drawings to that illustrated in Fig. 2 of said drawings. Thus, through the medium of the link 16 and the arm 11 the rod 8 is moved forwardly against the tension of the coil spring 10 thereby sliding the stripper forwardly or outwardly on the tines 6. Of course, in this manner the meat or other foods are removed. When the lever 12 is released the coil spring 10 immediately returns the rod 8 and the stripper 7 to inoperative or retracted position.

It is believed that the many advantages of a kitchen fork constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. A kitchen fork comprising a handle, a tubular shank mounted on said handle, a head comprising a pair of spaced tines mounted on one end portion of the tubular shank, a substantially U-shaped stripper operatively mounted in the head and slidable on the tines, said stripper being substantially channel-shaped in cross section for slidably receiving the head, a rod slidably mounted in the tubular shank and connected to the stripper for actuating said stripper, and means for actuating the rod.

2. A kitchen fork comprising a handle, a tubular shank mounted on said handle, a head comprising a pair of spaced tines mounted on one end portion of the tubular shank, a substantially U-shaped stripper operatively mounted in the head and slidable on the tines, said stripper being substantially channel-shaped in cross section for slidably receiving the head, a rod slidably mounted in the tubular shank and connected to the stripper for actuating said stripper, and means for actuating the rod, said means including an arm projecting from the rod, a hand lever pivotally mounted on the tubular shank adjacent the handle, and a link operatively connecting the arm to one end portion of said lever.

3. A kitchen fork comprising a handle, a tubular shank mounted on said handle, said shank having a longitudinal slot therein, a head comprising a pair of spaced, parallel tines mounted on one end portion of the tubular shank, a substantially U-shaped stripper operable in the head and slidable on the tines, said stripper being substantially channel shaped in cross section for slidably receiving the head, a rod slidably mounted in the tubular shank and secured to the stripper for actuating same, an arm on the rod operable in the slot, a lever pivotally mounted on the tubular shank adjacent the handle, and a link operatively connecting said lever to the arm for actuating the stripper.

4. A kitchen fork of the character described comprising an elongated handle having a socket extending thereinto from one end thereof, a tubular shank having one end portion engaged in the socket, said shank having a longitudinal slot therein, a head including a pair of spaced tines mounted on one end portion of the tubular shank, a substantially U-shaped stripper operable in said head and slidable on the tines, said stripper being substantially channel shaped in cross section for slidably receiving the tines, a rod extending slidably through the tubular shank and having one end secured to the stripper for actuating same, said rod extending into the socket in the handle, a head on the other end of said rod, a coil spring in the socket engaged in the second named head for retracting the rod and the stripper, an arm on the rod at an intermediate point operable in the slot, a lever mounted on the tubular shank, said lever including a pair of bars straddling the shank and pivotally connected thereto at an intermediate point, a handle on one end of the bars, and a link operatively connecting the other ends of the bars to the arm for actuating the rod and the stripper to projected position against the tension of the spring.

AUGUST JOHN LUNZ.